Dec. 26, 1944. C. L. PIKE 2,365,727
DASHPOT DAMPING SYSTEM
Filed Jan. 23, 1943
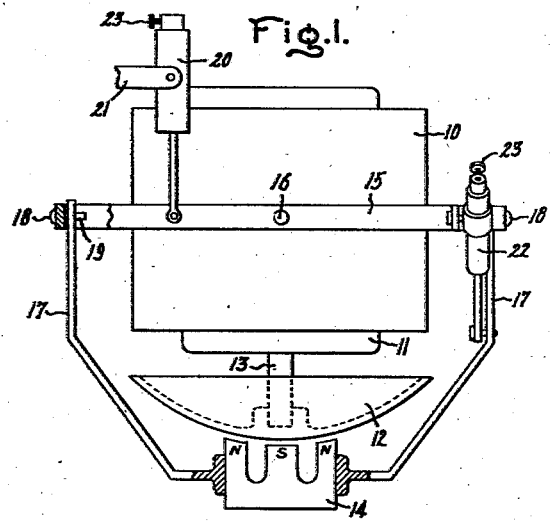
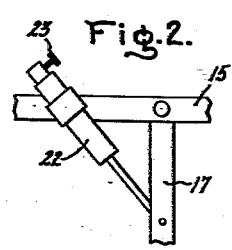
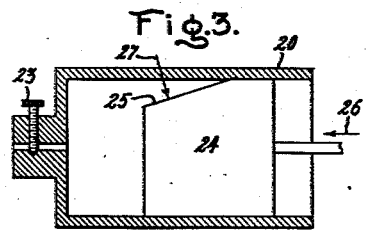
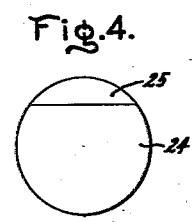
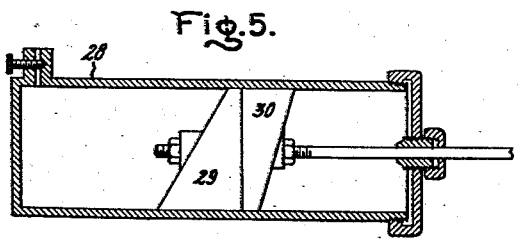
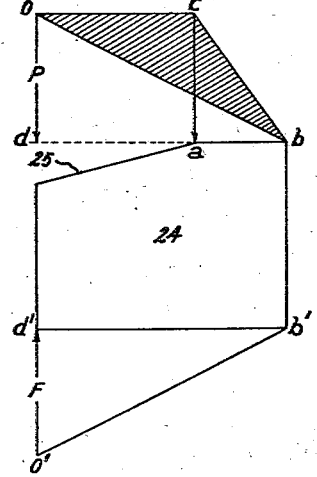
Inventor:
Carl L. Pike,
by Harry E. Dunham
His Attorney.

Patented Dec. 26, 1944

2,365,727

UNITED STATES PATENT OFFICE 2,365,727

DASHPOT DAMPING SYSTEM

Carl L. Pike, East Saugus, Mass., assignor to General Electric Company, a corporation of New York Application January 23, 1943, Serial No. 473,400

6 Claims. (Cl. 188—94)

My invention relates to a dashpot damping system and mechanism which, although not limited thereto, is particularly suited for use on the pendulous erecting device for aeroplane gyroscopes to obtain stabilization regardless of the altitude of the aeroplane, and my invention will be described as used for such purpose.

The features of my invention which are believed to be novel and patentable will be pointed out in the claims appended hereto. For a better understanding of my invention reference is made in the following description to the accompanying drawing in which Fig. 1 represents parts of a gyroscope horizon for use on aeroplanes to which my invention is applied. Fig. 2 is a partial side view of the apparatus of Fig. 1 as seen from the left side. Fig. 3 is a sectional detail view of a preferred form of dashpot for use on aeroplane gyroscopes. Fig. 4 is an end view of the piston used in Fig. 3. Fig. 5 represents a further modification of my invention and Fig. 6 is a diagram, explanatory of certain pressure relations characteristic of my invention.

In Fig. 1 I have represented parts of a gyroscope horizon which are used on aeroplanes for basic position maintaining purposes. The gyroscope may be of the electric motor-driven type in which 10 represents the stator and 11 the rotor of the motor, and such rotor comprising the gyroscope spinning element with its spin axis approximately normally vertical. The gyroscope will be mounted in gimbals not shown so as to be free to maintain its basic position when the aeroplane on which it is mounted turns, dives, etc. Such gyroscopes require an erecting device to prevent wandering of the spin axis of the gyroscope from its desired basic substantially vertical position and the type of erecting device shown comprises a conductor element 12 mounted symmetrically on the bottom end of the shaft 13 of the rotor and having a lower surface generally in the shape of a sphere together with a permanent magnet 14 suspended as a universal pendulum with respect to the gyroscope beneath and in close proximity to the spherical surface of conductor 12.

The pendulum magnet 14 is suspended by a gimbal ring 15 pivoted on a normally horizontal axis 16 and a bail member 17 pivoted to gimbal ring 15 on an axis 18 at right angles to and intersecting axis 16. One of the pivots for bail member 17 is shown at 19. This is a common form of eddy current erecting device in which eddy currents are produced in the spinning conductor 12 by the flux from magnet 14. Such eddy currents produce a drag on the rotating conductor and a precessing force of the gyroscope in case its spin axis and the central vertical axis of the magnet become unsymmetrical. If the spin axis of the gyroscope is incorrect, such precessing force erects or brings the spin axis back to correct position. Such erection assumes that the magnet is in correct erecting position of rest which it normally takes, due to gravity and its pendulum mounting.

However, due to acceleration and turning of the aeroplane on which the gyroscope is mounted, the pendulum magnet at times will swing and depart from its correct erecting position and when this happens the precessing force will cause erroneous erection. It is desirable therefore that the erecting magnet return quickly to its correct erecting position if displaced therefrom. Experience with this type of device has demonstrated that if the periods of oscillation of the pendulum about its two axes are nearly equal, the pendulum is unstable and, if displaced from correct position, a torsional oscillation of the pendulum may occur which increases in violence until it upsets the gyroscope. A copending application of Albert Hansen, Jr., Serial No. 469,536, filed December 19, 1942, explains the reason for this and discloses various means for making the period of oscillation of the pendulum about one axis approximately half of its period of oscillation about the other axis to obtain stability and a quick return of the magnet to correct erecting position if and when displaced therefrom.

Another way of preventing instability disclosed herein is by the use of dashpot damping of the pendulum mounting about its two axes. In Fig. 1 I have shown a dashpot 20 between a support 21 fixed to the aeroplane and the gimbal ring 15, and a second dashpot 22 between the gimbal ring 15 and the bail 17, whereby oscillation of these parts about their axes is damped and only relatively slow movements thereof can occur. The dashpot cylinders are provided with adjustable vents as at 23 and I have found that by proper adjustment of such dashpots the arrangement is very effective in obtaining stability and a prompt return of the erecting magnet to correct position if and when displaced therefrom. I have also discovered that if ordinary dashpots are properly adjusted at one atmospheric pressure, say when the plane is one-half mile above the earth, they require readjustment at a different atmospheric pressure, say when the plane is several miles above the earth, in order to be effective under both conditions. The manual adjustment of dashpot devices by the pilot at various different flying levels might be possible but is wholly impracticable. Automatic adjustment in response to a pressure sensitive altimeter is also impracticable. These discoveries and observations led to experiments resulting in a modified form of dashpot shown in Fig. 3, which is sufficiently effective at all atmospheric pressures encountered in flight to require no attention after once being properly adjusted for average conditions.

As shown in Fig. 3 the dashpot has a cylindrical piston 24 of some length and with a corner side slided off at a diagonal at 25 at an angle of about 17 degrees. The piston may be solid or hollow but for the small size pistons (about one-quarter inch in diameter) used for the gyroscope application, solid pistons are the least expensive. In addition to the damping action of the ordinary dashpot this dashpot with the piston 24 shaped as shown has a new variable friction damping or checking component which increases with the rate of travel of the piston in its cylinder and which is little influenced by changes in atmospheric pressure. The reason for this is that when the piston is moving in the direction of arrow 26 and air is compressed behind it, a portion of the compressed air enters the wedge-shaped recess and produces a pressure on the sloping face 25 as indicated by the arrow 27 which has a large component in a direction to push the piston sideways towards the lower wall of the cylinder, causing friction between the piston and cylinder wall from a cause which is not present in the usual dashpot. This extra friction caused by an unbalance of pressure laterally of the piston may be referred to as sidewise friction to distinguish it from the normal friction which is always present when two surfaces move relative to each other. This sidewise friction increases in proportion to the pressure difference between the opposite ends of the cylinder as may be explained in connection with Fig. 6. In Fig. 6 let P represent the difference in pressure between the two ends of the cylinder and assume that along the contacting surfaces of piston and cylinder the pressure drop lengthwise of the piston is uniform. Over that length and side of the piston covered by the sliced-off part at 25 at its center the pressure P exists up to the point $a$ and from $a$ to point $b$ at the right hand end of the cylinder the pressure drops off as is indicated by sloping line $cb$. On the diametrically opposite or full cylindrical side of the piston the pressure drops off from one end of the piston to the other as indicated by line $o'b'$. Then, neglecting the other considerations such as the angle between the surface 25 and line $da$, the sidewise pressure may be considered as being equal to the difference between the area of $docb$ and the area of $d'b'o'$. This difference is equal to the shaded area $ocb$ and is proportional to $$P\frac{da}{ab}$$

This is also true for opposite direction of movement of the piston which causes the forces of pressure and friction to reverse in direction. The sidewise friction F due to this pressure difference is not only proportional to the pressure P but also to the rate of movement of the piston, assuming P to be constant. However, P also increases with the rate of movement of the piston so that it is evident that the sidewise friction F increases very rapidly with increases in the rate of movement of the piston. Hence, the novel dashpot is very effective with respect to permitting slow movements and checking fast movements.

As pointed out above, the damping component which is due to sidewise pressure and friction is proportional to the pressure difference on opposite ends of the piston and is not greatly affected by differences in atmospheric pressure met with in aeronautics because such changes will in general affect both end pressures alike. Hence, dashpots with pistons of the form shown in Fig. 3, when used on the device of Fig. 1, give very satisfactory damping results from ground levels to stratosphere levels without the need of adjustment when passing from one level to the other. This has been successfully demonstrated by tests.

In Fig. 5 I have shown another modification of my invention in which the dashpot cylinder 28 is closed at both ends and both ends of the piston are sloped to produce an accumulative effect of sidewise friction. The piston is made in two sections, 29 and 30, with inwardly facing contacting surfaces at right angles to the axis of the cylinder, so they may be relatively rotated to adjust the sidewise friction checking characteristic. The slope on one outwardly facing surface may be different from that of the other outwardly facing surface as indicated. As illustrated with the sloping sides most nearly parallel, the piston is adjusted for maximum friction checking.

In Fig. 5 it may be assumed that sufficient amount of air can leak in and out of the right-hand end of the double dashpot to serve as a restricted vent such as shown at the left end of the cylinder, except that the latter is made adjustable and that no more air leaks past the pistons than is the case with the usual dashpot subject to like pressure differences on opposite sides of the piston. Fig. 5 may be considered to comprise the equivalent of two dashpots such as are shown in Fig. 3 which act together with the usual damping effect in adding relation. The sidewise pressures which produce added friction in accordance with the present invention will add when the pistons 29 and 30 are assembled as shown, but they may be made to subtract if one part 30 is rotated 180 degrees from the position shown. This sidewise friction producing effect depends upon the pressure difference on opposite sides of the piston when the piston is moved. The degree to which the cylinder is vented at its opposite end and the degree to which air leaks past the piston influence this sidewise pressure only as the pressure difference on opposite sides of the piston is influenced.

What I claim as new and desire to secure by Letters Patent of the United States is:

1. A dashpot comprising a solid cylindrical wall hollow cylinder, a piston movable therein causing a variation in the pressure relation on opposite sides of the piston, said piston being shaped for the purpose of and to cause the pressure difference on opposite ends of the piston to produce a substantial sidewise pressure on said piston resulting in sidewise friction between the piston and cylinder proportional to such pressure difference.

2. A dashpot comprising a hollow cylinder having at least one end closed and having an adjustable vent in such end, a piston movable in said cylinder causing a variation in the pressure relation on opposite sides of the piston, the end surface of said piston facing such closed end of said cylinder being shaped to cause an unbalanced sidewise pressure on said piston when it is moved at a sufficient rate to cause a pressure difference between its opposite ends, which unbalanced sidewise pressure is proportional to such pressure difference and results in sidewise friction between the piston and cylinder.

3. A dashpot comprising a hollow cylinder closed at one end, a solid piston movable in said cylinder and when so moved causing a pressure difference on opposite ends of the piston proportional to its rate of movement, said piston having an end wall portion opposite the closed end of said cylinder which is sloped at an angle to the end wall whereby a pressure difference between the ends of said piston produces a sidewise pressure component on said piston and a corresponding sidewise friction component between the piston and cylinder which increases with the rate of movement of said piston.

4. A dashpot comprising a hollow cylinder closed at both ends, a piston fitted in and movable axially of said cylinder, said piston having oppositely sloping end walls whereby when the piston is moved to create a pressure difference between its opposite ends there is also created a sidewise pressure component on the piston which produces a sidewise friction component between the piston and cylinder which increases with such pressure difference.

5. A dashpot comprising a hollow cylinder closed at its ends, a piston fitted in and axially movable in said cylinder, said piston comprising two piston parts having inwardly facing contacting surfaces at right angles to the axis of the cylinder and outwardly facing end surfaces which are sloped at an angle to such contacting surfaces, said two piston parts being relatively adjustable about the axis of the cylinder so as to vary the angular relation between the outwardly facing end surfaces thereof, and means for securing said parts in any such adjusted relation, the outwardly sloping end surfaces of said piston serving to produce a sidewise pressure component on said piston proportional to the pressure difference on such surfaces when the piston is moved axially of the cylinder and a corresponding sidewise friction component between the piston and cylinder.

6. An air dashpot for use on aeroplanes where the atmospheric pressure varies over a considerable range due to different flying altitudes, said dashpot being designed to have a sufficiently constant damping effect under such different atmospheric pressure conditions as to avoid the necessity of adjustment under such different conditions, such design comprising a hollow cylinder closed at one end with its other end freely exposed to atmospheric pressure, and a piston fitted in and movable axially of said cylinder, said piston having an end surface portion opposite the closed end of said cylinder which is shaped to produce an unbalanced sidewise pressure component on the piston when the latter is moved to create a pressure difference between its opposite ends resulting in a corresponding sidewise friction component between the piston and cylinder, and an added friction checking function which depends primarily on the pressure difference between the two ends of the piston as distinguished from actual atmospheric pressure.

CARL L. PIKE.